United States Patent [19]
Cochran

[11] 4,083,609
[45] Apr. 11, 1978

[54] BRAKE ACTUATING SYSTEM

[76] Inventor: Thomas N. Cochran, Far Hills, N.J. 07931

[21] Appl. No.: 626,586

[22] Filed: Oct. 28, 1975

Related U.S. Application Data

[63] Continuation-in-part of Ser. No. 463,708, Feb. 15, 1974, abandoned, which is a continuation of Ser. No. 74,118, Sep. 21, 1970, abandoned, which is a continuation of Ser. No. 603,334, Dec. 20, 1966, abandoned.

[51] Int. Cl.² .......................... B60T 8/02; B60T 8/10
[52] U.S. Cl. .................................. 303/96; 180/82 R; 188/181 C; 303/113; 361/238; 361/242
[58] Field of Search .......................... 180/82 R, 82 B; 188/181 C; 303/91–119; 361/238–240, 242; 318/52; 324/161, 166; 340/53, 62

[56] References Cited

U.S. PATENT DOCUMENTS

| 3,260,555 | 7/1966 | Packer | 303/96 |
| 3,269,781 | 8/1966 | Van House | 303/98 X |
| 3,288,232 | 11/1966 | Shepherd | 303/96 X |

Primary Examiner—Stephen G. Kunin
Attorney, Agent, or Firm—Nolte and Nolte

[57] ABSTRACT

The present invention is a brake actuating and brake system for maintaining a predetermined proportional relationship between the rotational speeds of vehicle wheels by both applying and/or releasing hydraulic fluid brake pressure, and distributing released pressure back into the brake system.

1 Claim, 8 Drawing Figures

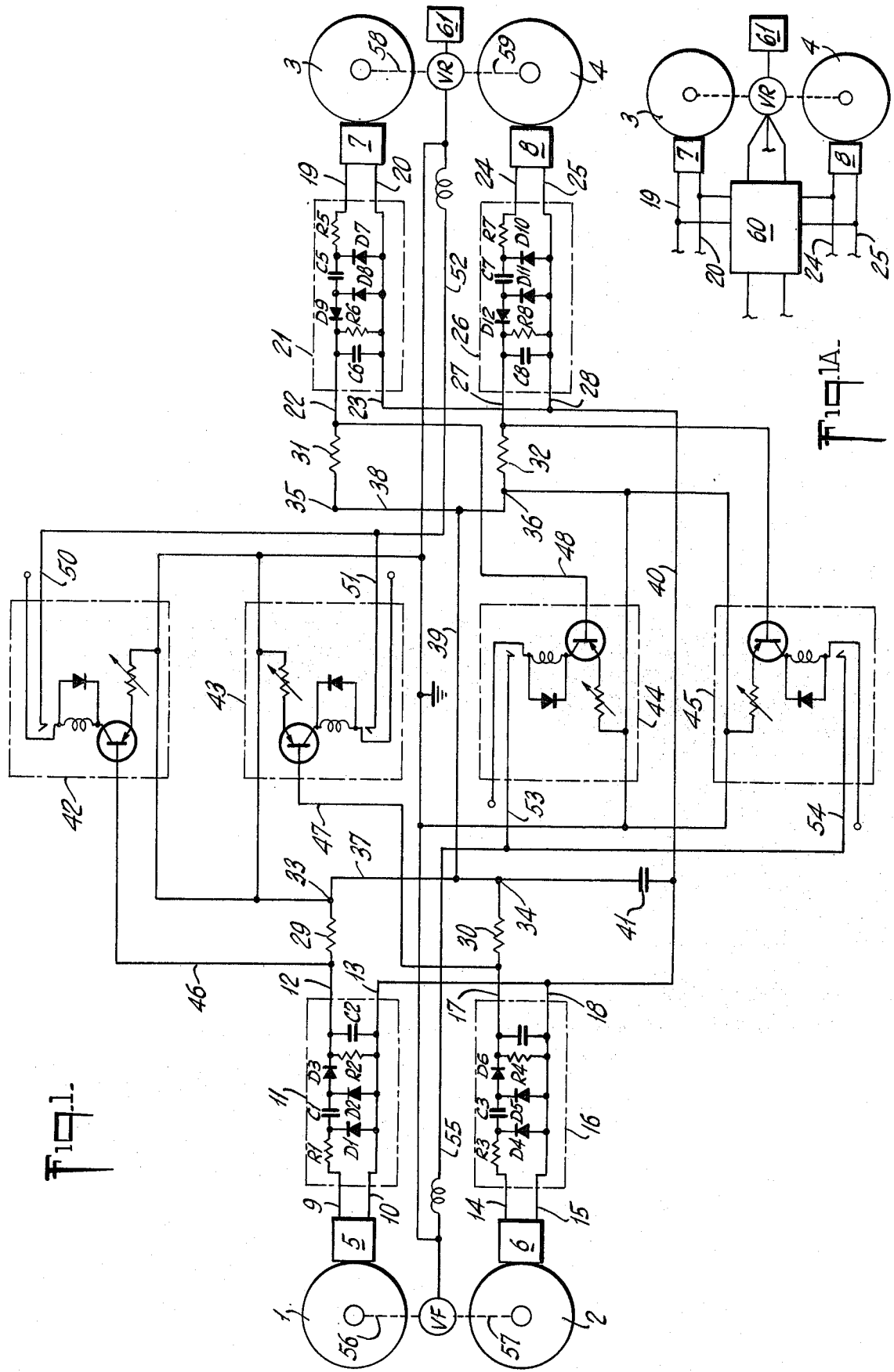

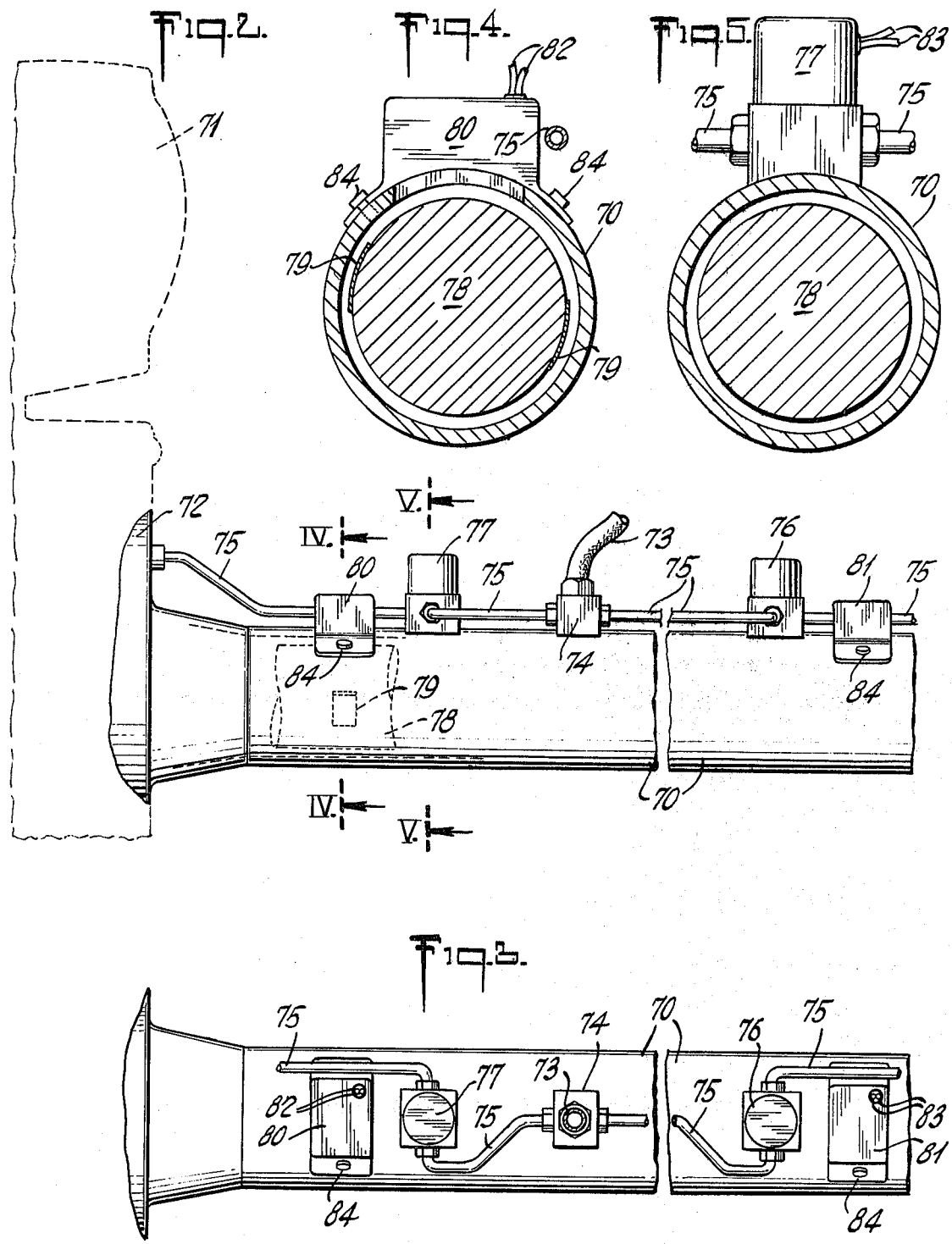

BRAKE ACTUATING SYSTEM

This is a continuation-in-part of application Ser. No. 463,708, filed Feb. 15, 1974, now abandoned, which was a continuation of application Ser. No. 74,118, filed Sept. 21, 1970, now abandoned which was a continuation of application Ser. No. 603,334 filed Dec. 20, 1966, now abandoned.

This invention relates to a brake system and more particularly to a braking system which operates as a function of the proportional relationships between the rotational speeds of vehicle wheels.

An object of the present invention is to provide a system which will determine the proportional relationship between rotational speeds of two or more wheels of a vehicle.

Another object of the present invention is to provide a system which, upon sensing the proportional relationship between wheel speeds, will perform a braking function in a predetermined manner.

Another object of the present invention is to provide a system which will maintain predetermined speed proportions between driving wheels or shafts of a vehicle.

A still further object of the present invention is to provide a system which will prevent skidding of a vehicle.

A further object of the present invention is to provide a brake system which will increase a vehicle's ability to progress on a surface having unfavorable traction properties.

The present invention fulfills the aforementioned objects and overcomes limitations and disadvantages of prior art solutions of problems known in the art by providing a brake system wherein speed detection means electrically sense the rotational speed of a moving part in a machine or vehicle, such as a wheel. The sensed information is electrically communicated to brake means which either apply or release fluid brake pressure as a function of the information received relating to the rotational speed of the moving part. In the case where the system attempts to slow down the rotational speed of the part or wheel, brake pressure is increased and braking forces are exerted such that the part or wheel is slowed. On the other hand, for the case where the system attempts to increase the rotational speed of the part or to minimize deceleration thereof, hydraulic braking pressure is released. In this latter mode, the invention provides for conserving and redirecting the brake pressure released from one or more wheels and redirects this brake pressure back into the brake system for increasing the brake pressure to the other wheels.

In this last respect the invention is particularly useful in fluid brake systems, where the conventional systems in anti-skid devices, for instance on air-brake vehicles, such as trucks and buses, are presently designed to release air pressure from the brake system to the atmosphere when a reduction in braking effort is required. Such release of pressure may occur more often than once per second. To maintain system pressure, it has been necessary to install larger, more expensive air compressors on vehicles which have anti-skid air brake systems. The present invention does not relieve brake effort by venting air pressure; the device instead conserves and redirects air pressure in an air brake system. Thus a further advantage of the invention is that smaller, lighter, and less costly air compressors may be installed, points of considerable utility to operators of the commercial vehicles which rely on air brakes.

Similarly, in conventional anti-skid hydraulic brake systems provision is made for closing off the addition of further liquid pressure to a skidding wheel and for permitting the brake cylinder from which pressure has been released to retract slightly but no provision is made for redistribution of brake pressure relieved at one wheel to the other wheels as does the present invention.

A constant pressure at each brake circuit may cause one or more wheels to "lock up" because one or more wheels have less traction on the road surface than do other wheels on the vehicle. The effect of anti-skid systems is to interrupt or reduce the application of brake pressure at the "locked-up" wheel. However, other anti-skid brakes tend either to bleed off and store fluid pressure applied by the driver, reducing the overall braking effort intended, or to automatically throw the vehicle into a full panic-stop mode not intended or needed. The latter action of the anti-skid brakes required by new law for trucks has created considerable opposition on the part of truck drivers.

Therefore, it is a further object of the invention to provide an anti-skid system wherein braking effort is automatically redirected to those wheels with superior traction, so that the overall braking effort intended by the operator is safely maintained and not artificially reduced or increased.

The invention will be more clearly understood from the following description of specific embodiments of the invention together with the accompanying drawings in which:

FIG. 1 is a schematic illustration of an electrical circuit arrangement capable of being used with the present invention;

FIG. 1A is a schematic representation of a portion of the circuit shown in FIG. 1 with the addition of elements of the present invention;

FIG. 2 is a fragmentary elevation view of a vehicle axle and the associated elements of the present invention;

FIG. 3 is a fragmentary plan view of the axle shown in FIG. 2;

FIG. 4 is a view taken along the line IV—IV of FIG. 2.

FIG. 5 is a view taken along the line V—V of FIG. 2;

Figure 6:
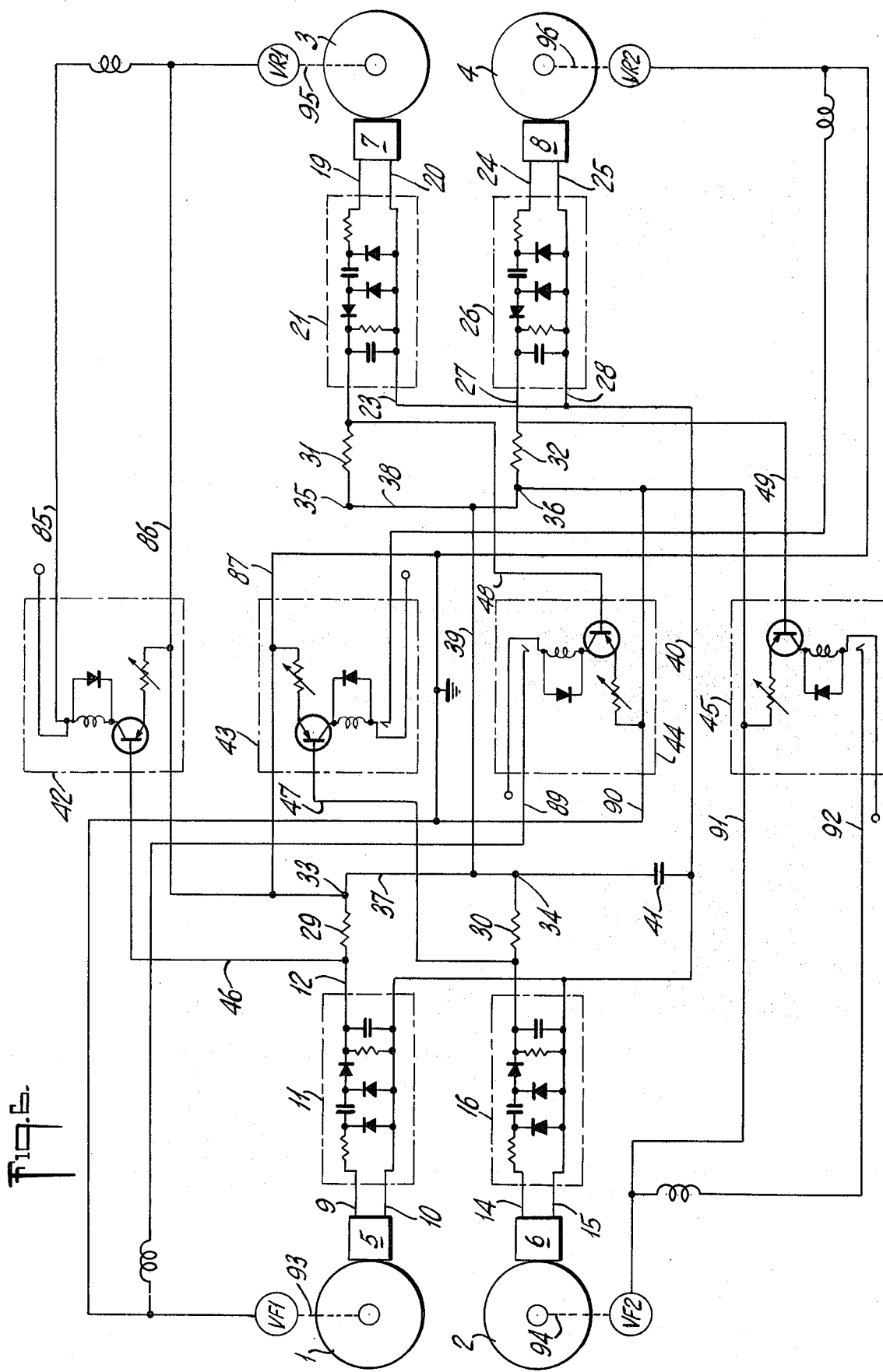
FIG. 6 is a schematic illustration of an electrical circuit of another embodiment of the present invention.

Referring now to FIG. 1 in which a circuit is shown in schematic arrangement with respect to the front and rear wheels of a vehicle in which the present invention may be utilized, front wheels 1 and 2 and rear wheels 3 and 4 are spaced in a manner as they would be if mounted on an automobile. A conventional automobile braking system may be used and slightly modified with the present invention, and thus brake drums, discs and a hydraulic system with brake balancing may be used. Signal generators 5, 6, 7 and 8 are associated with each wheel 1, 2, 3 and 4, respectively, in such a manner as to indicate the wheel speed via a signal.

Assuming signal generators 5, 6, 7 and 8 to be of the alternating current type, and referring now to signal generator 5 in particular, conductors 9 and 10 are electrically connected to a circuit arrangement 11, shown to be surrounded by dotted lines. Circuit arrangement 11 consists of resistors R1 and R2, capacitors C1 and C2, and diodes D1, D2 and D3 shown schematically in FIG. 1 and adapted to convert the alernating current signal generated by generator 5 into a direct current signal.

Emerging from the output side of circuit arrangement 11, conductors 12 and 13 are indicated. Referring now to signal generator 6, conductors 14 and 15 are shown leading from the alternating current generator 6 to circuit arrangement 16 containing resistors R3 and R4, capacitors C3 and C4, and diodes D4, D5 and D6. Circuit arrangement 16 will convert the alternating current signal carried by conductors 14 and 15 into a direct current signal carried by conductors 17 and 18 at the output portion of circuit arrangement 16.

Referring now to the electrical circuit associated with rear wheels 3 and 4, conductors 19 and 20 carry an alternating current signal generated by generator 7 and are electrically connected to circuit arrangement 21, which circuit arrangement contains resistors R5 and R6, capacitors C5 and C6, and diodes D7, D8 and D9. Circuit arrangement 21 is adapted to convert the alternating current signal carried by conductors 19 and 20 into a direct current signal carried by conductors 22 and 23 at the output portion of circuit arrangement 21.

Referring to signal generator 8, conductors 24 and 25 carry an alternating current signal from signal generator 8 to circuit arrangement 26 which, in turn, contains resistors R7 and R8, capacitors C7 and C8, and diodes D10, D11 and D12. Thus, as in the case for circuit arrangements 11, 16 and 21, circuit arrangement 26 converts an alternating current signal into a direct current signal carried by conductors 27 and 28 at the output portion thereof.

Output signals carried by conductors 12, 17, 22 and 27 are fed through resistances 29, 30, 31 and 32 respectively. It is to be noted that once terminals 33 and 34 are connected by line 37, and since terminals 35 and 36 are connected by line 38 and further, since lines 37 and 38 are joined by line 39, terminals 33, 34, 35, and 36 of resistances 29, 30, 31 and 32 are at substantially the same potential.

Also, the outputs carried by conductors 13, 18, 23 and 28 are at substantially the same potential due to their being interconnected by line 40.

A capacitance, designated by numeral 41, is situated between lines 39 and 40 and is charged up to the potential of line 39 which, in turn is the potential of the generated signal. The purpose of the presence of the capacitance 41 in the circuit is to cause a discharge through resistances 29, 30, 31 and 32 when direct current signals decrease slowly, as would be the case during braking of wheels 1-4 in the absence of a skid condition. For the case where any of wheels 1-4 are skidding, the signal generated by the respective wheel or wheels will fall very rapidly. However, the wheels that are not skidding will continue to generate a signal and thus the line voltage of line 39 will assume a voltage substantially proportional to the vehicle wheel(s) speed, and thus a large voltage will exist across the resistance associated with the skidding wheel. More specifically, if wheel 1 is in a skidding condition, a large potential will exist across resistance 29, this potential providing a signal which is fed to another part of the overall circuit to be described below.

It is within the scope of the present invention to provide means for amplifying the signals obtained as heretofore described and thus, amplifying means 42, 43, 44 and 45 are provided for the signals produced and associated with wheels 1, 2, 3 and 4.

Amplifying means 42 receives signals generated by signal generator 5 and converted into DC signal carried by conductor 12 via line 46 which electrically connects conductor 12 with the input portion of amplifying means 42. Similarly, the signal carried by conductor 17 is fed into amplifying means 43 via line 47. The signal carried by conductor 22 is fed into the input portion of amplifying means 44 via line 48; and the signal carried by conductor 27 is fed into the input portion of amplifying means 45 via line 49.

The output of amplifying means 42 is fed to line 52 via line 50, while the output of amplifying means 43 is fed to line 52 via line 51. Line 52 is connected to the circuit of valve VR which controls the distribution and pressure of hydraulic fluid being fed to the brakes in wheels 3 and 4.

The output of amplifying means 44 is fed to line 55 via line 53, while the output of amplifying means 45 is fed to line 55 via line 54. Line 55 is connected to the circuit of valve VF which controls distribution and pressure of hydraulic fluid being fed to front wheels 1 and 2.

The hydraulic linking of valve VF with wheels 1 and 2 is schematically shown by dotted lines 56 and 57, and similarly dotted lines 58 and 59 show the hydraulic linkage of valve VR with wheels 3 and 4 respectively. The mechanical operation of this portion of the apparatus will be described in more detail below.

Referring now to FIG. 1A, compensating means 60 is shown to be electrically connected to conductors 19 and 20 associated with wheel 3, and conductors 24 and 25 associated with wheel 4. Compensating means 60 is connected to valve VR and solenoid means 61 such that, under predetermined conditions, a signal is sent to solenoid means 61 and valve VR and hydraulic brake fluid is compressed by means of solenoid means 61 and fed to a wheel to be braked or slowed down.

Referring now to FIG. 6, it is seen that in another embodiment of the system shown in FIG. 1 valves VR1, VR2, VF1 and VF2 are associated with wheels 3, 4, 1 and 2 respectively, thereby enabling the user of the present invention to influence the rotational speed of each wheel independently, as opposed to the system shown in FIG. 1 wherein valve VF influences wheels 1 and 2 simultaneously, and wherein valve VR influences wheels 3 and 4 in the same manner.

In FIG. 6, conductors 85 and 86, 87 and 88, 89 and 90, and 91 and 92 are connected to the output of amplifying means 42, 43, 44 and 45 respectively. Conductors 85 and 86 are electrically connected to valve VR1; conductors 87 and 88 with valve VR2; conductors 89 and 90 with valve VF1 and conductors 91 and 92 with valve VF2. Therefore, via hydraulic lines 93, 94, 95 and 96, valves VF1, VF2, VR1 and VR2 control wheels 1, 2, 3 and 4 respectively.

Figure 7:
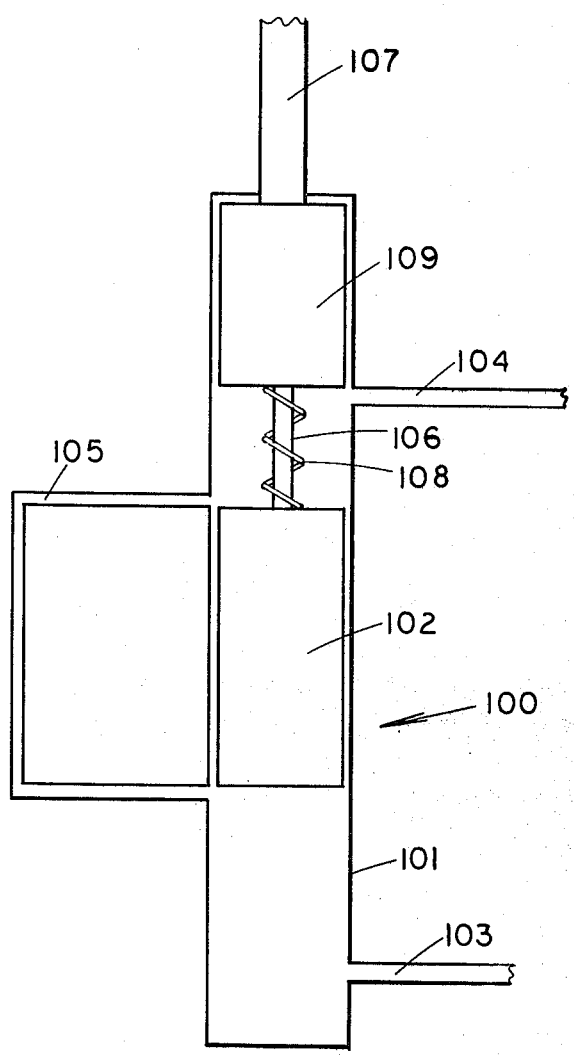
FIG. 7 is a diagrammatic illustration of a valve structure particularly adaptable for use in the invention.

In this embodiment of the invention, a valve which is shown diagrammatically in FIG. 7 can be used to control braking pressure at each wheel. Similarly, valves such as shown in FIG. 7 can be incorporated in valves VF and VR diagrammatically depicted in FIG. 1.

In any event, valve 100 comprises a cylinder 101, main piston 102 and sliding piston 109 together with communicating lines from and to a wheel brake circuit 103; from and to the brake pedal 104 and an elbow section 105 communicating above and below the main piston 102. Rod 106 connects the main piston 102 and the arm 107 to the actuating solenoid.

The sliding piston 109 is loosely fit about the rod 106 and spring 108 retains the sliding piston and main piston apart.

A fluid seal, not shown, is provided between the arm 107 and valve housing 101 so that the loose fit of the sliding piston on rod 106 will not result in leakage.

FIG. 7 diagrammatically shows the valve in the normal position in which braking fluid is pressurized in lines 103, 104 and 105.

When the signal from the circuitry disclosed causes arm 107 and main piston 102 to move downwardly in response to the requirement for a limited slip differential effect, the main piston passes the bottom of elbow section 105 and then compresses the fluid beneath main piston 102. This compression of fluid causes a pressure increase in the line 103 to the brake circuit of the slipping wheel. When arm 107 retracts, sliding piston 109 lags as the main piston recovers toward normal position urging the sliding piston via spring 108 upwardly. The purpose of the sliding piston is to prevent surge in the main brake reservoir which would otherwise result from vacuum and then pressure created when the main piston goes down and then upward.

Importantly, when the signal directs the arm 107 upwardly resulting in the upward movement of main piston 102, an anti-skid pressure-release situation, fluid pressure is relieved from the affected brake circuit to the extent main piston 102 moves upward. Sliding piston 109 cannot move further upward; therefore, the distance between main piston and sliding piston is reduced. The effect is to further compress the fluid between these two pistons and force fluid pressure out through line 104. Even though line 104 is already pressurized by the brake pedal, the upward movement of main piston 102 causes an increase in pressure, via 104 to hydraulic lines to other wheels, that is proportional to the relief at the "locked-up" wheel. Thus, the overall braking effort intended by the driver is maintained, unlike other systems which override the driver's desired braking effort.

Thus it is seen that when a vehicle containing the present invention is traveling at a uniform speed, generators 5, 6, 7 and 8 will put out signals which are substantially the same. Capacitance 41, after a finite length of time, will reach the potential of the converted signals through resistances 29, 30, 31 and 32. If the vehicle is slowed during a normal braking operation in the absence of skidding, the direct current signals, as described above, will decrease slowly, such that a discharge of capacitance 41 will occur through resistances 29, 30, 31 and 32. Should one or more wheels assume a skidding condition, the direct current signal associated with the skidding wheel will decrease rapidly due to the lower or nil rotational speed of the wheel, and due to the non-skidding rotational condition of the remaining wheels, the potential at the respective terminals (any of terminals 33, 34, 35 and 36) will be proportional to the speed of the vehicle. It can be seen that a large potential will exist across the resistance associated with the skidding wheel. This potential is sensed and fed through the amplifying means associated with the skidding wheel, resulting in actuation of the appropriate valve, which valve will selectively release brake pressure in a predetermined manner and proportionately transmit the increased pressure from the skidding wheel via valve 100 to the other wheels.

In order that the operation of the elements of FIG. 1A does not interfere with the operation of the elements of FIG. 1, a switch (not shown) of a known type is installed such that depression of the brake pedal or other member will engage the circuit of FIG. 1 and disengage the circuit of FIG. 1A. When the brake pedal is not depressed, the circuit of FIG. 1A is operative and that of FIG. 1 is inoperative.

In addition to the operation described in the preceding paragraph, the present invention is capable of increasing hydraulic fluid brake pressure to any one or more of wheels 1, 2, 3 and 4, the rotational speed of which is sought to be decreased. In the event the vehicle is situated on a surface such that one driving wheel is on a slippery surface and the other is on a surface possessing good traction properties, the wheel on the slippery surface will tend to spin, while the other wheel will have a rotational speed substantially zero. Compensating means 60 will receive a substantially low signal from the wheel which is not turning and will receive a substantially stronger signal from the wheel that is spinning. Compensating means 60, responding to the signal, will then electrically actuate solenoid means 61 which, in turn, will apply fluid brake pressure to the wheel which is spinning on the slippery surface, thereby slowing the spinning wheel and increasing the overall traction properties of the vehicle.

It is contemplated and with the scope of the present invention to provide such a system for machinery other than vehicles having rotating parts, and it is further contemplated that the present invention having application and be utilized in vehicles which are sea-going or airbound.

Referring now to FIG. 2, a rear axle housing 70 is shown in an elevation view as an example of the type of structure associated with conventional automobiles. The outline of a tire 71 is shown in dotted lines to be concentric with brake housing 72. A portion of a flexible hydraulic fluid line 73 is shown communicating with a distributing unit 74, which may be of the conventional type. Hydraulic lines 75 extend from distributing unit 74 and communicate with solenoid activated valves 76 and 77. From valves 76 and 77, hydraulic lines 75 feed the braking unit (not shown) in brake housing 72.

Within rear axle housing 70, rear axle 78 is free to rotate and has secured to the periphery thereof at least one strip of magnetic tape 79, shown in FIGS. 2 and 4. Sensing units 80 and 81 are secured to rear axle housing 70 adjacent the portion of rear axle 78 having the magnetic tape 79 mounted thereon. Sensing units 80 and 81 may be of conventional design and are adapted to detect and sense the rotational speed of rear axle 78. This information is transmitted to portions of the circuit shown in FIG. 1 via conductors 82, for example, shown in FIG. 4. Similarly, information from the circuit shown in FIG. 1 is transmitted to the solenoid activated valves 76 and 77 via wires 83, shown in FIG. 5. In a preferred embodiment of the present invention, sensing units 80 and 81 may be mounted to rear axle housing 70 by bolts 84; however, it is within the scope of this invention to provide for other fastening means and different element locations.

Reference to lines 37–40 and 46–55, of course, refers to conductors or "lines" of electrically conductive material.

The embodiments of the invention particularly disclosed are presented merely as examples of the invention. Other embodiments, forms and modifications of the invention coming within the proper scope of the appended claims will of course readily suggest themselves to those skilled in the art.

It is within the scope of the present invention to provide apparatus to insure that rotational speeds of members driven through a differential remain within any desired proportional relationship. By varying the behavioral characteristics of the elements, such as the valves, resistors, line sizes, etc., it is possible and contemplated to accomplish predetermined and selected present conditions. The present apparatus also makes it possible for the operator of a vehicle to vary these proportions and speeds at his discretion, or for the variations to occur automatically, dependent on operations of another part of the machine, such as the turning of a steering gear. In some embodiments of the present invention, the apparatus is electro-hydraulic, and is installed outside the differential, acting on existing vehicle braking systems or upon specially added braking systems. Furthermore, the present apparatus may be installed by an automobile dealer after the assembly of the vehicle.

It is also within the scope of the present invention to provide a fail-safe device having two pick-ups adjacent a conductor such that, should either of the pick-ups or the conductor fail, the solenoid would not act. If one wheel's electrical circuit were to break or if the conductor fastened on the brake should dislodge, the system would work to brake the other wheel, in the absence of the fail-safe device.

Furthermore, it is within the scope of the present invention to have magnetic tape or other means secured to a brake drum or disc, or to have magnetic tape disposed in another suitable location.

What is claimed is:

1. In a vehicle having at least four wheels at least two of which wheels may be non-driven and any one or more of which wheels which are driven may assume an overspeeding or a skid condition, a brake actuating system utilized to influence the rotational speed of all said wheels comprising means for actuating the same, means for sensing the rotational speed of each wheel and for generating a signal representing the same, means for amplifying and transmitting each signal to valve means for separately controlling the application and reduction of brake effort to each portion of the braking system associated with each wheel, the improvement comprising means for sensing the differences in rotational speeds of each of the wheels, means for electrically communicating the sensed information to said valve means for selectively increasing and decreasing brake effort to each of the wheels as a function of the information received for varying the rotational speeds of said wheels, such that said valve means are selectively activated for applying brake pressure to any of the driven wheels in an overspeeding condition, and are selectively activated for reducing brake pressure to any of the wheels rotating at a speed substantially less than that of the fastest wheel, said valve means comprising means for directing the brake pressure produced at any such wheel to be applied through said brake actuating system to increase the brake pressure to all of the other wheels, means connecting said brake actuating system and said sensing and communicating means for actuating said means for reducing pressure only when said brake actuating system is actuated, each said valve means consisting of communicating lines from the brake circuit of the vehicle and from the brake pedal, and piston and circuit means for receiving pressure from a locked or relatively slowly rotating wheel and being directly responsive thereto for increasing the brake pressure in the line communicating with the brake pedal and the other wheels.

* * * * *